US012718741B2

(12) United States Patent
Zhao et al.

(10) Patent No.: US 12,718,741 B2
(45) Date of Patent: Aug. 25, 2026

(54) DISPLAY DEVICE, DRIVING METHOD THEREFOR, AND DISPLAY TERMINAL

(71) Applicant: Guangzhou China Star Optoelectronics Semiconductor Display Technology Co., LTd., Guangzhou (CN)

(72) Inventors: Guoyun Zhao, Guangzhou (CN); Zhibin Zhang, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/006,877

(22) Filed: Dec. 31, 2024

(65) Prior Publication Data

US 2026/0148677 A1 May 28, 2026

(30) Foreign Application Priority Data

Nov. 27, 2024 (CN) ......................... 202411719976.4

(51) Int. Cl.
*G09G 3/20* (2006.01)

(52) U.S. Cl.
CPC ... *G09G 3/2096* (2013.01); *G09G 2340/0435* (2013.01)

(58) Field of Classification Search
CPC ..................... G09G 3/2096; G09G 2340/0435
See application file for complete search history.

(56) References Cited

U.S. PATENT DOCUMENTS 10,991,321 B1 * 4/2021 Chen .................... G09G 3/3426
2011/0169723 A1 * 7/2011 Hsu ...................... G09G 3/3677 345/100

FOREIGN PATENT DOCUMENTS

CN 111816133 A * 10/2020 ........... G09G 3/3648
KR 102464249 B1 * 11/2022 ........... G09G 3/3677

* cited by examiner

*Primary Examiner* — Towfiq Elahi
(74) *Attorney, Agent, or Firm* — PV IP PC; Peter Stecher; Wei Te Chung

(57) ABSTRACT

A display device, a driving method therefor, and a display terminal are provided. A level shifter of the display device is configured to generate a first clock signal. A control signal generated by a timing controller in a case where a refresh rate is greater than a preset value is configured to control the level shifter to process the first clock signal to generate a second clock signal. The second clock signal includes a plurality of second clock pulses one-to-one corresponding to a plurality of first clock pulses of the first clock signal. An end time of each of the second clock pulses is later than an end time of a corresponding one of the first clock pulses.

12 Claims, 5 Drawing Sheets

DISPLAY DEVICE, DRIVING METHOD THEREFOR, AND DISPLAY TERMINAL

CROSS-REFERENCE TO RELATED APPLICATIONS

This application claims priority to Chinese Patent Application No. 202411719976.4 filed on Nov. 27, 2024. The disclosure of the aforementioned application is incorporated herein by reference in its entirety.

TECHNICAL FIELD

The present disclosure relates to the technical field of display, in particular to a display device, a driving method for a display device, and a display terminal.

BACKGROUND

In display technology, charge sharing (CS) technology may realize charge sharing when two signals with opposite phases are switched between high potential and low potential, reduce the extra voltage difference needed for active switching, and reduce the power consumption of drivers.

However, the waveform of the signal acted by the CS technology may change, which may cause transistors in a pixel circuit to fail to completely turn off in time, and thus cause data signals of subsequent other rows to leak into the pixel circuit of the current row. The lower the refresh rate, the longer the leakage time, the greater the risk of mischarging, and the greater the impact on image quality.

SUMMARY

The embodiments of the present disclosure provide a display device, including:

a display panel;

a timing controller configured to generate a control signal according to a refresh rate of the display panel, the control signal being a first control signal in a case where the refresh rate is greater than a preset value; and a level shifter electrically connected to the timing controller, configured to generate a first clock signal and configured to process the first clock signal to generate a second clock signal in a case where the control signal is the first control signal;

where the first clock signal includes a plurality of first clock pulses, the second clock signal comprises a plurality of second clock pulses corresponding to the plurality of the first clock pulses, a duration of each of the second clock pulses overlaps a duration of a corresponding one of the first clock pulses, and an end time of each of the second clock pulses is later than an end time of a corresponding one of the first clock pulses.

The embodiments of the present disclosure further provide a display terminal including the display device as described in any one of the above, and a motherboard electrically connected to the display device. The motherboard is configured to transmit at least an image signal to the display device to control the display panel to display.

The embodiments of the present disclosure further provide a driving method for a display device. The display device includes a display panel, a timing controller, and a level shifter electrically connected to the timing controller. The driving method of the display device includes:

controlling the level shifter to generate a first clock signal, the first clock signal including a plurality of first clock pulses;

controlling the timing controller to acquire a refresh rate of the display panel and to generate a control signal according to the refresh rate, where the control signal is a first control signal in a case where the refresh rate is greater than a preset value; and controlling the level shifter to process the first clock signal to generate a second clock signal in a case where the control signal is the first control signal, where the second clock signal includes a plurality of second clock pulses corresponding to the plurality of the first clock pulses, a duration of each of the second clock pulses overlaps a duration of a corresponding one of the first clock pulses, and an end time of each of the second clock pulses is later than an end time of a corresponding one of the first clock pulses.

DETAILED DESCRIPTION

The technical solutions in the embodiments of the present disclosure will be described clearly and completely hereinafter with reference to the accompanying drawings. Apparently, the described embodiments are only a part of but not all embodiments of the present disclosure. All other embodiments obtained by those skilled in the art based on the embodiments of the present disclosure without creative efforts shall fall within the protection scope of the present disclosure.

In the description of the present disclosure, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In the description of the disclosure, "a plurality of" means two or more than two, unless otherwise specified.

In addition, it should be noted that the accompanying drawings only provide structures closely related to the present disclosure, and some details not related to the invention are omitted, so as to simplify the accompanying drawings and make the inventive points clear at a glance, and do not indicate that the actual device is identical to the accompanying drawings, and do not limit the actual device.

The present disclosure provides a display panel that may include, but is not limited to, the following embodiments and combinations between the following embodiments.

Figure 1:
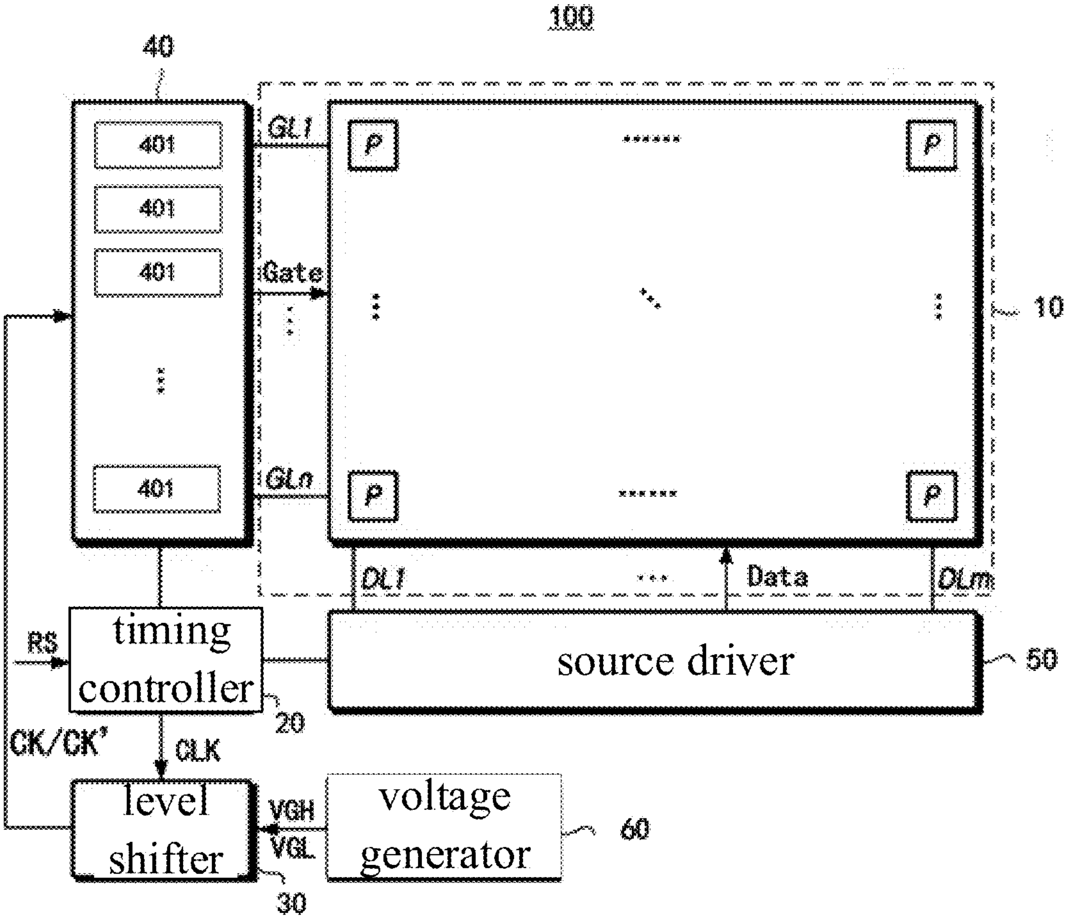
FIG. 1 is a structural block diagram of a display device provided by some embodiments of the present disclosure.
Figure 2:
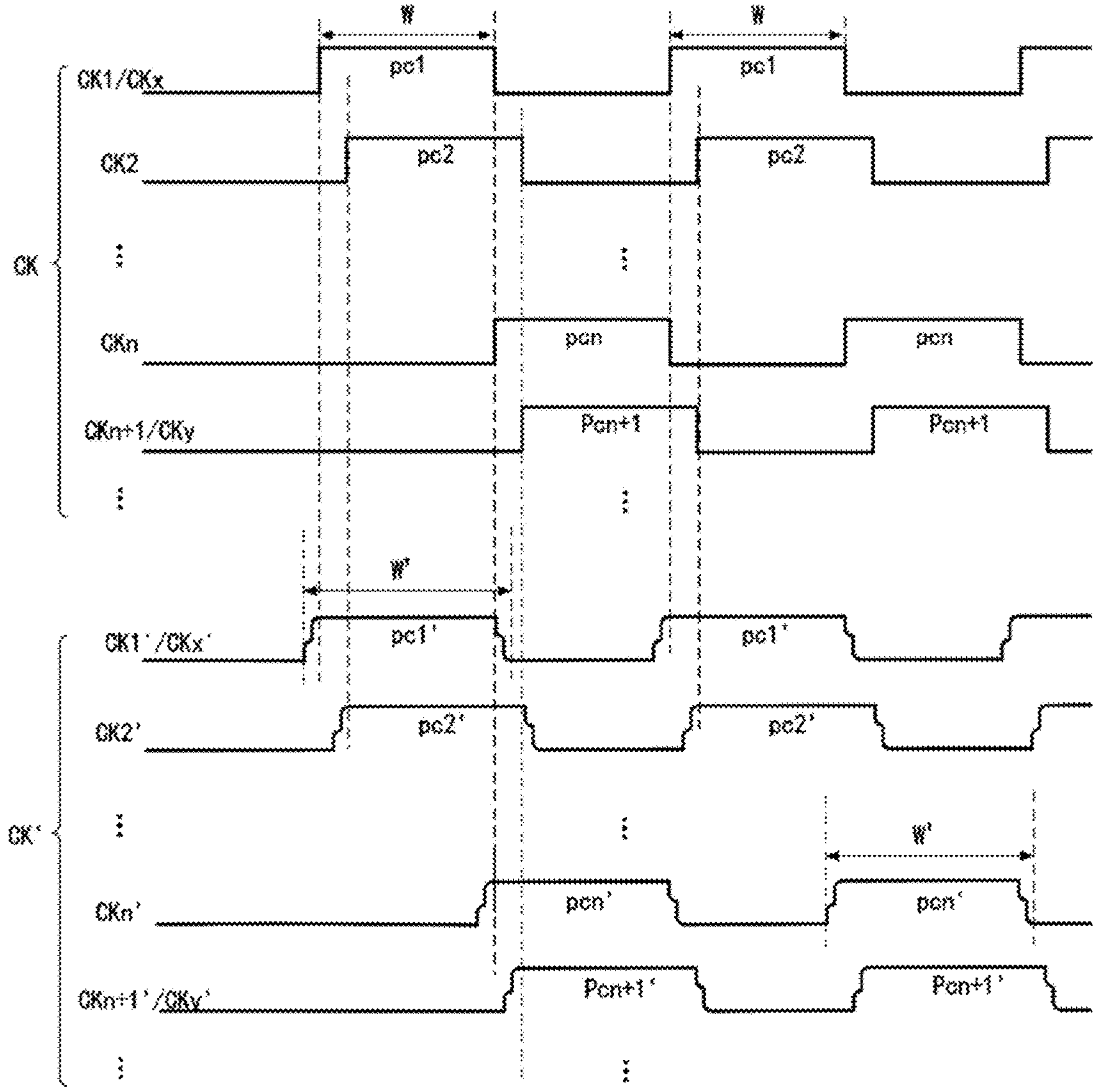
FIG. 2 is a waveform diagram of some signals provided by some embodiments of the present disclosure.

In some embodiments, referring to FIGS. 1 and 2, the display device 100 includes a display panel 10, a timing controller 20, and a level shifter 30. The timing controller 20 is configured to acquire a refresh rate RS of the display panel 10 and is configured to generate a control signal CON according to the refresh rate RS. The control signal CON is a first control signal in the case where the refresh rate RS is greater than a preset value. The level shifter 30 is electrically connected to the timing controller 20, is configured to generate a first clock signal CK, and is configured to process the first clock signal CK to generate a second clock signal CK' in the case where the control signal CON is the first control signal. The first clock signal CK includes a plurality of first clock pulses, the second clock signal CK' includes a plurality of second clock pulses corresponding to the plurality of the first clock pulses. A duration of one of the second clock pulses overlaps a duration of a corresponding one of the first clock pulses. An end time of one of the second clock pulses is later than an end time of a corresponding one of the first clock pulses.

However, the display panel 10 may be, but is not limited to, an organic self-luminous display panel, an inorganic self-luminous direct display display panel, or a liquid crystal display panel. As shown in FIG. 1, taking a plurality of sub-pixels P in the display panel 10 is provided in an array as an example for description, the sub-pixels P may be arranged in n rows and m columns, and n and m are both positive integers. Further, the display panel 10 may include a plurality of gate lines (GL1 to GLn) and a plurality of data lines (DL1 to DLm). The display device 100 may further include a source driver 50 electrically connected to a plurality of data lines and a gate driver 40 electrically connected to a plurality of gate lines. The gate driver 40 may be a gate driving circuit located on a substrate of the display panel 10 or a chip provided independently of the display panel 10.

Specifically, each of the gate lines (any one of GL1 to GLn) is electrically connected to a corresponding row of the plurality of sub-pixels P to output a corresponding gate signal Gate (including a plurality of gate active pulse configured to control the sub-pixels to be turned on) thereto. A plurality of rows of the sub-pixels P are sequentially turned on under the control of a plurality of gate active pulses of the plurality of gate signals Gate. Each of a plurality of data lines (any one of DL1 to DLm) is connected to a corresponding column of the plurality of sub-pixels P to output a corresponding data signal Data (including a plurality of data voltages corresponding to the corresponding column of the plurality of the sub-pixels P) thereto. A plurality of data signals Data corresponding to a plurality of columns of sub-pixels P are configured to transmit corresponding data voltages to corresponding ones of the sub pixels P through the plurality of the data lines (DL1 to DLm) when each row of sub pixels P are turned on.

Specifically, as shown in FIGS. 1 and 2, the first clock signal CK generated by the level shifter 30 may include a plurality of sub-clock signals (including at least the sub-clock signals CK1 to CKn+1 in FIG. 2). Each of a plurality of gate driving units 401 of the gate driver 40 may be controlled by at least one sub-clock signal to generate a corresponding gate signal Gate. A plurality of gate active pulses of the gate signal Gate may be generated according to pulses of a corresponding sub-clock signal. That is, a plurality of first clock pulses of the first clock signal CK acting on the plurality of gate driving units 401 are configured to determine durations of the plurality of gate effective pulses in the plurality of gate signals Gate.

Figure 3:
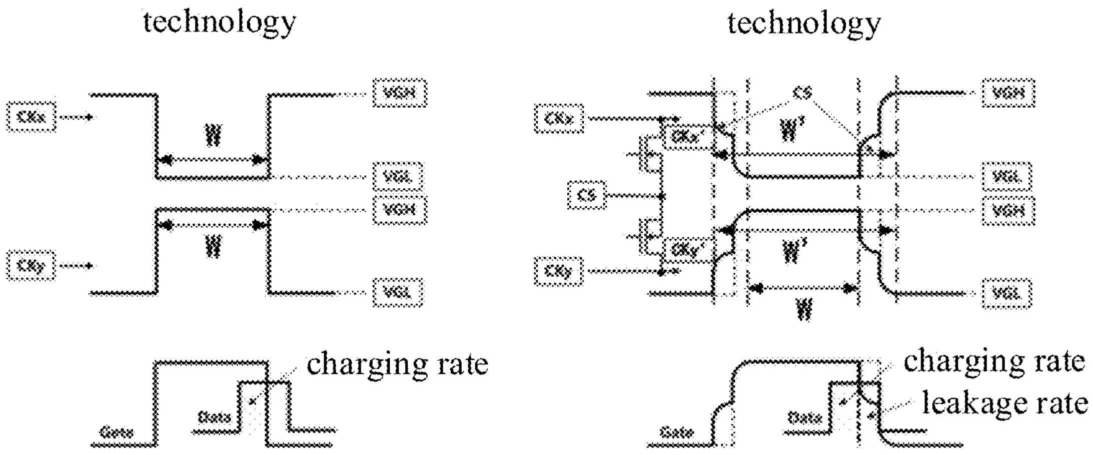
FIG. 3 is a schematic diagram of an enabled charge sharing technology and a disabled charge sharing technology provided by some embodiments of the present disclosure.

As shown in FIG. 3, in the charge sharing technology, during rising edges and falling edges of a first sub-clock signal CKx (such as the sub-clock signal CK1) and a second sub-clock signal CKy (such as the sub-clock signal CKn), which are opposite in phase in the first clock signal CK, By shorting the two clock lines used for transmitting the first sub-clock signal Ckx and the second sub-clock signal Cky (that is, a transistor between the two clock lines is turned on), the potentials of the two clock lines can be synthesized. The synthesized potential CS approaches an average value of a potential of the high-voltage signal VGH and a potential of the low-voltage signal VGL. Then, a higher or lower voltage signal is further supplied through the chip to realize the switching for the potential of the first sub-clock signal CKx and the potential of the second sub-clock signal CKy from the potential of the high-voltage signal VGH to the potential of the low-voltage signal VGL and from the potential of the low-voltage signal VGL to the potential of the high-voltage signal VGH, thereby reducing the power consumption of the chip.

Figure 4:
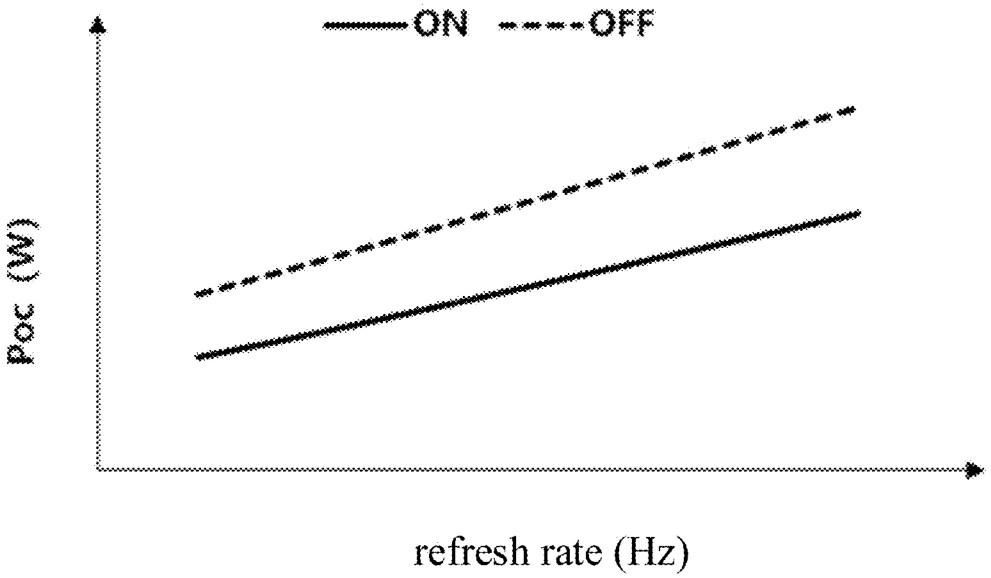
FIG. 4 is a power-refresh rate curve diagram of the display device in the case where charge sharing technology is enabled and disabled provided by some embodiments of the present disclosure.

As shown in FIG. 4, "ON" and "OFF" respectively represent the power-refresh rate curve diagrams of the chip in the case where the charge sharing technology is enabled and the charge sharing technology is disabled. It can be seen that compared with the disabled charge sharing technology, the power consumption Poc of the chip under the enabled sharing technology is smaller at each refresh rate, that is, the power consumption of the chip may be reduced under the enabled charge sharing technology.

For convenience of description, it is defined that the first sub-clock signal CKx and the second sub-clock signal CKy form the first post-shared sub-clock signal CKx' and the second post-shared sub-clock signal CKy', respectively, by the above-described charge sharing technology. It can be seen from FIG. 3 that compared with the starting point and the end point of a pulse of the first sub-clock signal CKx, the starting point of a corresponding pulse of the first shared sub-clock signal CKx' is advanced, and the end point of the corresponding pulse of the first shared sub-clock signal CKx' is delayed. Compared with the start point and the end point of a pulse of the second sub-clock signal Cky, the start point of a corresponding pulse of the second shared sub-clock signal CKy' is advanced, and the end point of the corresponding pulse of the second shared sub-clock signal CKy' is delayed.

It should be noted that since the gate effective pulses of a gate signal Gate is generated according to the pulses (referred to as the first clock pulses) in a corresponding sub-clock signal, and the end points of the pulses of the first shared sub-clock signal CKx' and the second shared sub-clock signal CKy' formed by the charge sharing technology are delayed, the end points of the gate effective pulses in the generated gate signal Gate are also delayed, resulting in the transistors in the sub-pixels P not being completely turned off in time, resulting in the leakage of data signals in the subsequent other rows into the current row of the sub-pixels P. The lower the refresh rate, the longer the leakage time (the leakage amount may be the "leakage rate" in FIG. 3, and the normal required charging amount may be the "charging rate" in FIG. 3), the greater the risk of mischarging, and thus the greater the influence on image quality.

Figure 5:
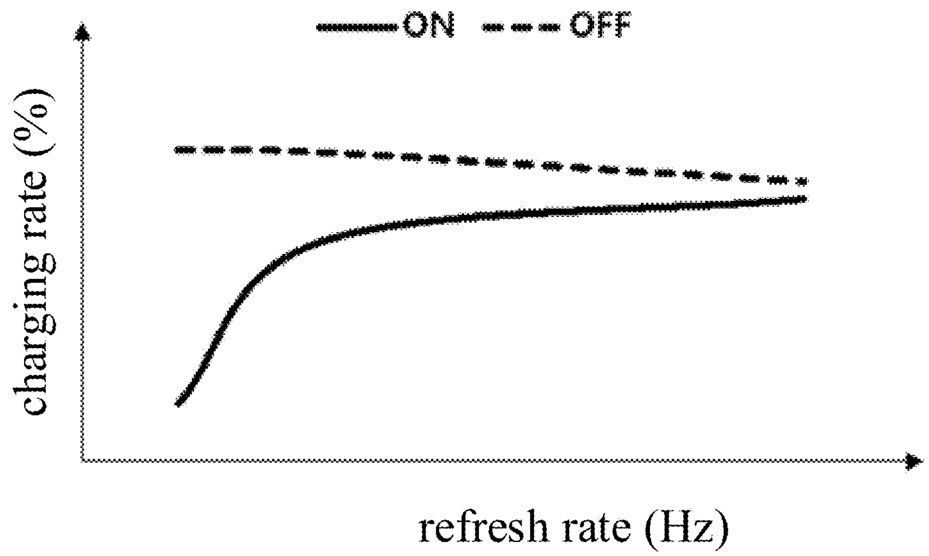
FIG. 5 is a charging rate-refresh rate curve diagram of the display device in the case where charge sharing technology is enabled and disabled provided by some embodiments of the present disclosure.

As shown in FIG. 5, "ON" and "OFF" respectively represent the charging rate-refresh rate curve diagrams of the chip where the charge sharing technology is enabled and the charge sharing technology is disabled. It can be seen that compared with the disabled charge sharing technology, the charging rate of the chip under the enabled sharing technology is smaller at each refresh rate, that is, the charging rate of the chip may be reduced under the enabled charge sharing technology. However, at high refresh rate, whether the charge sharing technology is enabled has little effect on reducing the charging rate. Only at low refresh rates, the enabled charge sharing technology may cause reduction in charging rate.

As shown in FIGS. 2 and 3, the second clock signal CK' in the embodiments includes a plurality of second clock pulses (having a first pulse width W') corresponding to a plurality of first clock pulses (having a first pulse width W). A duration of each of the second clock pulses overlap a duration of a corresponding one of the first clock pulses. An end time of each of the second clock pulses is later than an end time of a corresponding one of the first clock pulses. That is, the second clock signal CK' may be understood as obtained by charge sharing for the first clock signal CK. Specifically, the first clock signal CK includes a first sub-clock signal CKx (such as a sub-clock signal CK1) and a second sub-clock signal CKy (such as a sub-clock signal CKn) which are opposite in phase. A charge sharing technology is applied to the two sub-clock signals, so that corresponding two shared sub-clock signals may be obtained. The two shared sub-clock signals are a sub-shared sub-clock signal CK1' corresponding to the sub-clock signal CK1 and a sub-shared sub-clock signal CKn' corresponding to the sub-clock signal CKn, respectively. The end point (i.e., the end time) of a first clock pulse of each shared sub-clock signal is later than the end time of a corresponding first clock pulse of the corresponding sub-clock signal.

Specifically, since the level shifter 30 is configured to process the first clock signal CK to generate the second clock signal CK' only in the case where the control signal CON is the first control signal, otherwise it may be considered that the second clock signal CK' is not generated, it may be considered that the gate driver 40 is configured to generate the first gate signal according to the first clock signal CK in the case where the refresh rate is less than or equal to a preset value, and is configured to generate the second gate signal according to the second clock signal CK' in the case where the refresh rate is greater than the preset value. As can be seen from the above discussion, the gate active pulses of the first gate signal are generated according to the first sub-clock signal CKx and the second sub-clock signal CKy which are opposite in phase in the first clock signal CK. The gate active pulses of the second gate signal is generated according to the first shared sub-clock signal CKx' and the second shared sub-clock signal CKy' which are opposite in phase in the second clock signal CK'.

As can be understood, based on the display device 100 of the embodiments of the present disclosure having a function of generating the second clock signal CK' according to the first clock signal CK, the timing controller 20 acquires the refresh rate RS of the display panel 10 and generates the control signal CON according to the refresh rate RS, and the control signal CON is the first control signal in the case where the refresh rate RS is greater than a preset value. The level shifter 30 is configured to process the first clock signal CK to generate the second clock signal CK' in the case where the control signal CON is the first control signal (that is, in the case where the refresh rate RS is large). That is, whether the charge sharing technology is enabled in the embodiments is determined according to the refresh rate RS of the display panel 10, instead of processing the first clock signal CK to generate the second clock signal CK' by using the charge sharing technology at all refresh rates. The charge sharing technology is enabled only in the case where the refresh rate RS is large, and the charge sharing technology is not enabled in the case where the refresh rate RS is small, so that the problem of poor image quality caused by the high risk of mischarging caused by the use of the charge sharing technology at a low refresh rate may be avoided.

In some embodiments, the timing controller 20 is configured to control the level shifter 30 through the control signal CON to process the first clock signal CK to generate the second clock signal CK' in the case where the refresh rate RS is greater than a preset value, such as, but not limited to, 144 Hz. As can be seen from the above discussion, it can be seen that if the charge sharing technology is used to process the first clock signal CK at a low refresh rate, the generated second clock signal CK' will lead to a greater risk of mischarging. Therefore, in the embodiments, only in the case where the refresh rate RS is greater than the preset value, the control signal CON generated by the timing controller 20 controls the level shifter 30 to process the first clock signal CK to generate the second clock signal CK'. As shown in FIGS. 1, 2 and 5, since the refresh rate is high, the leakage time is short, and the risk of mischarging is small, even if the second clock signal CK' is generated by the charge sharing technology, the charging rate will not be greatly reduced, but the power consumption of the chip may be reduced.

In the case where the refresh rate RS is less than or equal to a preset value, the control signal CON generated by the timing controller 20 may control the level shifter 30 not to process the first clock signal CK to generate the second clock signal CK', but to generate the gate signal Gate directly through the first clock signal CK, so as to avoid the problem of serious insufficiency of charging rate due to a large refresh rate as shown in FIG. 5.

Figure 6:
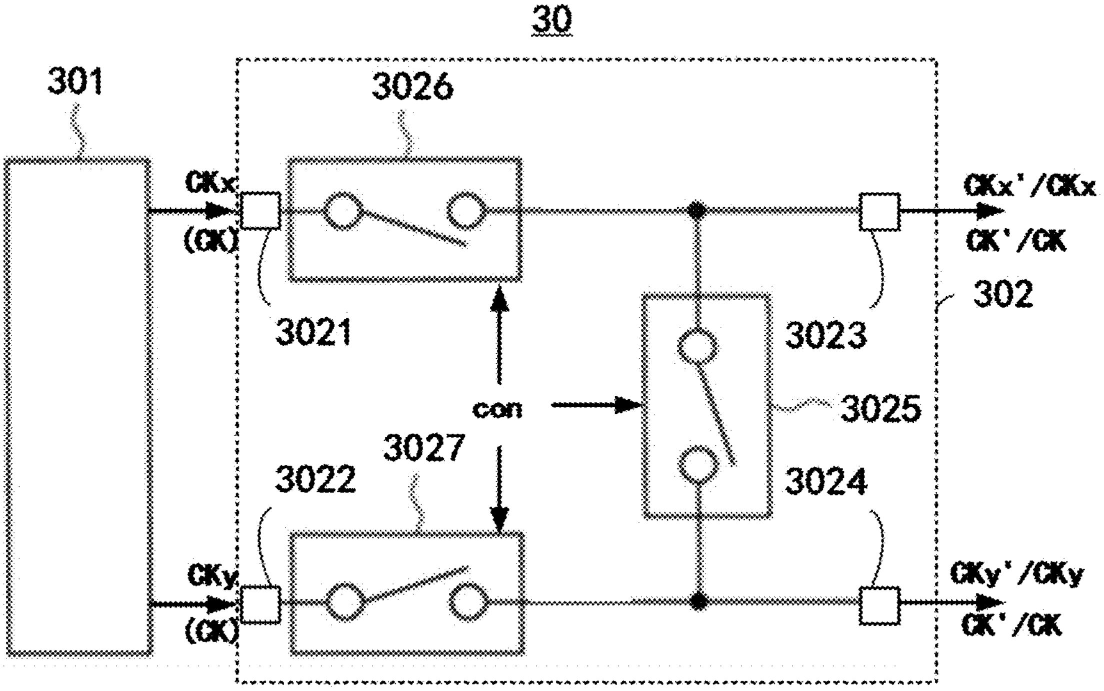
FIG. 6 is a structural block diagram of a level shifter provided by some embodiments of the present disclosure.

In some embodiments, as shown in FIGS. 1, 2, and 6, the level shifter 30 includes a level shift module 301 and a charge sharing module 302. The level shift module 301 is configured to generate the first clock signal CK. The charge sharing module 302 is electrically connected to the level shift module 301, and is configured to determine whether to process the first clock signal CK to generate the second clock signal CK' according to the control signal CON.

Specifically, as shown in FIGS. 1 and 6, the display device 100 may further include a voltage generator 60 configured to provide a high-voltage signal VGH and a low-voltage signal VGL to the level shifter 30. The timing controller 20 is further configured to provide a clock source signal CLK to the level shifter 30. The level shift module 301 may generate a first clock signal CK according to the high-voltage signal VGH, the low-voltage signal VGL, and the clock source signal CLK. The high potential and the low potential of the plurality of sub-clock signals (including at least the sub-clock signals CK1 to CKn+1) of the first clock signal CK may be the same as the potential of the high-voltage signal VGH and the potential of the low-voltage signal VGL, respectively. The frequencies of the plurality of sub-clock signals may be equal to the frequency of the clock source signal CLK. There is a phase difference between two of the plurality of sub-clock signals.

Further, the charge sharing module 302 may determine whether to process the first clock signal CK to generate the second clock signal CK' according to the control signal CON. In the case where it is necessary to generate the second clock signal CK', the charge sharing module 302 performs charge sharing processing on both of the plurality of sub-clock signals that are opposite in phase, that is, a line for transmitting the first sub-clock signal CKx (such as the sub-clock signal CK1) and a line for transmitting the second sub-clock signal CKy (such as the sub-clock signal CKn) are short-circuited to generate corresponding two sub-shared sub-clock signals CK1', CKn' (together referred to as the second clock signal CK'). In the case where it is not necessary to generate the second clock signal CK', the charge sharing module 302 directly outputs the first clock signal CK.

In some embodiments, as shown in FIGS. 2 and 6, the charge sharing module 302 includes a first input module 3021, a second input module 3022, a first output module 3023, a second output module 3024, and a first switching module 3025. The first input module 3021 is configured to receive the first sub-clock signal CKx (such as the sub-clock signal CK1). The first sub-clock signal CKx includes a plurality of first sub-clock pulses (such as the pulses pc1 of the sub-clock signal CK1). The second input module 3022 is configured to receive the second sub-clock signal CKy. The second sub-clock signal CKy (such as the sub-clock signal CKn) includes a plurality of second sub-clock pulses (such as the pulses pc1 of the sub-clock signal CK1) corresponding to a plurality of the first sub-clock pulses. The first output module 3023 is electrically connected to the first input module 3021. The second output module 3024 is electrically connected to the second input module 3022. The first switching module 3025 is electrically connected between the first input module 3021 and the second input module 3022. The control signal CON is configured to control whether the first switching module 3025 is turned on at the end time of the first sub-clock pulse, such as the pulse pc1 of the sub-clock signal CK1. That is, the first switching module 3025 is configured to control the first output module 3023 to output the first sub-clock signal CKx and to control the second output module 3024 to output the second sub-clock signal CKy according to the control signal CON, or to control the first output module 3023 to output the first shared sub-clock signal CKx' and to control the second output module 3024 to output the second post-shared sub-clock signal CKy'.

As can be seen from the above discussion, since the first switching module 3025 is electrically connected between the first input module 3021 and the second input module 3022, the conduction condition thereof may determine whether the first sub-clock signal CKx and the second sub-clock signal CKy are charge-shared. In the case where the first switching module 3025 is turned on, the first sub-clock signal CKx and the second sub-clock signal CKy perform charge sharing, and the first shared sub-clock signal CKx' output by the first output module 3023 is the same as the second shared sub-clock signal CKy' output by the second output module 3024, and the potential thereof is equal to the average value of the potential of the high-voltage signal VGH and the potential of the low-voltage signal VGL. In the case where the first switching module 3025 is turned off, the first sub-clock signal CKx and the second sub-clock signal CKy do not share charges, and it may be considered that the first output module 3023 directly outputs the first sub-clock signal CKx, and the second output module 3024 directly outputs the second sub-clock signal CKy.

In some embodiments, as shown in FIGS. 2 and 6, the charge sharing module 302 further includes a second switching module 3026 and a third switching module 3027. The second switching module 3026 is electrically connected between the first input module 3021 and the first output module 3023. The third switching module 3027 is electrically connected between the second input module 3022 and the second output module 3024. The control signal CON is configured to control the second switching module 3026 and the third switching module 3027 to be turned off in the case where the first switching module 3025 is turned on, and to control the second switching module 3026 and the third switching module 3027 to be turned on in the case where the first switching module 3025 is turned off. That is, the second switching module 3026 is configured to control whether the first input module 3021 transmits the first sub-clock signal CKx to the first output module 3023 according to the control signal CON. The third switching module 3027 is configured to control whether the second input module 3022 transmits the second sub-clock signal CKy to the second output module 3024 according to the control signal CON.

As can be understood, the above-described second switching module 3026 and the third switching module 3027 are provided in the embodiments. In the case where the first switching module 3025 is turned on, the first sub-clock signal CKx and the second sub-clock signal CKy perform charge sharing, the second switching module 3026 and the third switching module 3027 are both controlled to be turned off, so that it is not only beneficial to perform the above-described charge sharing to adjust the voltages output by the first output module 3023 and the second output module 3024 to generate the first shared sub-clock signal CKx' and the second shared sub-clock signal CKy', but also may stop the driving level shifter 30 from being driven by the timing controller 20 and the voltage generator 60.

In the case where the first switching module 3025 is turned off, the first sub-clock signal CKx and the second sub-clock signal CKy do not share charges, and the second switching module 3026 and the third switching module 3027 are both controlled to be turned on, so that it is not only beneficial to perform the above charge sharing to adjust the voltages output by the first output module 3023 and the second output module 3024, but also the level shifter 30 is continuously driven by the timing controller 20 and the voltage generator 60, the first output module 3023 directly outputs the first sub-clock signal CKx, and the second output module 3024 directly outputs the second sub-clock signal CKy.

In some embodiments, as shown in FIG. 1, the timing controller 20 is configured to obtain a frame blanking duration of a previous frame picture, and is configured to determine the corresponding refresh rate RS according to the frame blanking duration. Alternatively, the timing controller 20 may be configured to determine the corresponding refresh rate RS according to a frame start signal.

As discussed above, the data signal Data includes a plurality of data voltages corresponding to a column of the plurality of sub-pixels P. The duration of the interval between two adjacent data voltages in one frame is called a row blanking duration. In two adjacent frames, the duration of the interval between the data voltage of a last row of sub-pixels P in the previous frame and the data voltage of a first row of sub-pixels P in the subsequent frame is called a frame blanking duration. The duration of each frame may be composed of the scanning time and the frame blanking duration. In the case of a certain scanning time, it may be considered that the longer the frame blanking duration, the lower the refresh rate RS, and vice versa. Therefore, the current refresh rate RS may also be determined according to the frame blanking duration.

As shown in FIG. 2, the frame start signal may also act on the gate driver 40 to drive a plurality of stages of gate driving units 401 to generate a plurality of gate signals Gate step by step. A pulse in the frame start signal triggers one of the gate driving units 401 to generate a corresponding gate effective pulse in the corresponding gate signal Gate. Then the Gate effective pulse drives the other stages of gate driving units 401 step by step to perform scanning of one frame. It can be considered that a sum of the duration between two adjacent pulses in the frame start signal and the pulse width of the pulse is equal to a duration of one frame, so the corresponding refresh rate RS may also be determined according to the frame start signal.

The present disclosure also provides a display terminal including the display device as described above and a motherboard electrically connected to the display device. The motherboard is configured to transmit at least an image signal to the display device to control the display panel to display. Specifically, the motherboard may receive image information and control information input from the front end of the display terminal to convert them into image signals and control signals acting on the display device. The gate signal Gate may be generated according to the control signal. The data signal Data may be considered to be generated according to the image signal and the control signal.

Figure 7:
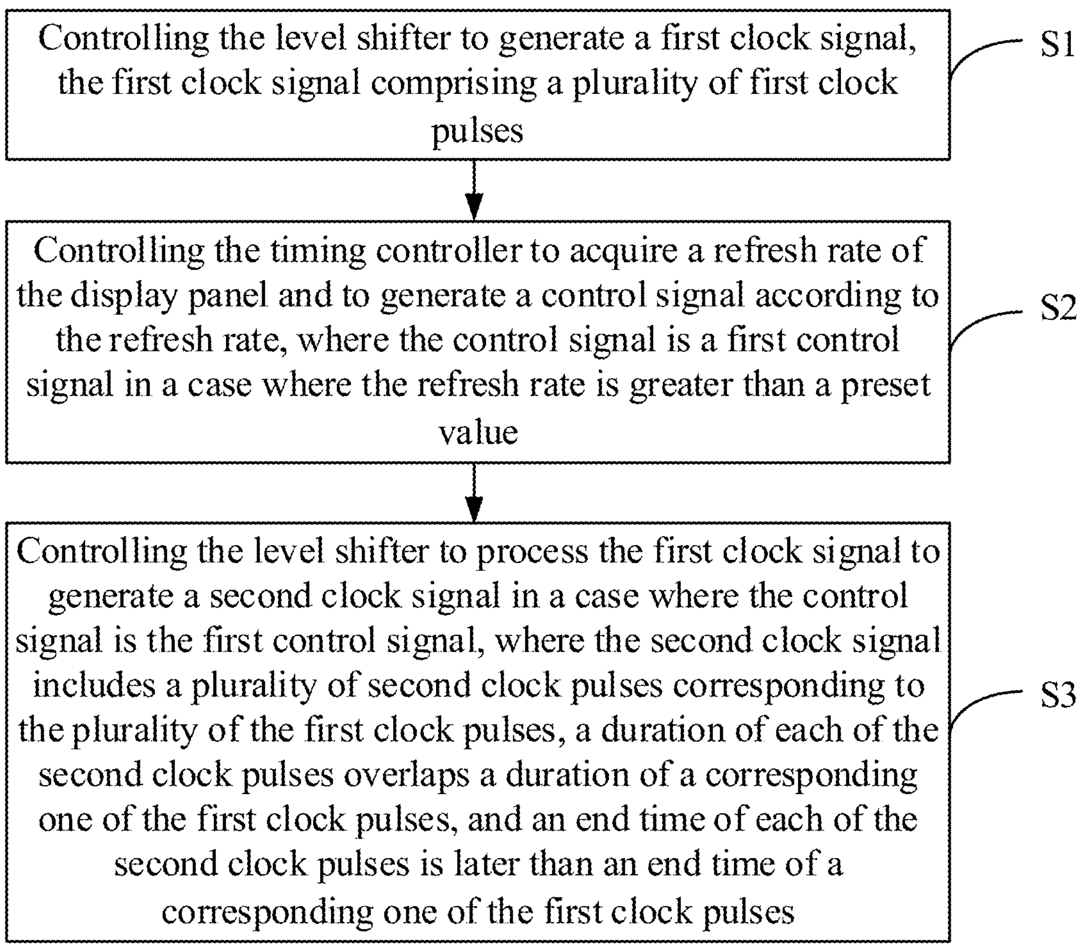
FIG. 7 is a flowchart of a driving method for the display device provided by some embodiments of the present disclosure.

The present disclosure also provides a driving method for a display device 100. The display device 100 includes the above-described display panel 10, a timing controller 20, and a level shifter 30 electrically connected to the timing controller 20. As shown in FIG. 7, the driving method for the display device includes, but is not limited to, the following steps S1 to S3.

At step S1, the level shifter is controlled to generate a first clock signal including a plurality of first clock pulses.

As can be seen from the above discussion, regardless of the value of the refresh rate RS, the level shifter 30 needs to generate the first clock signal CK according to the clock source signal CLK supplied by the timing controller 20 and the high voltage signal VGH and the low voltage signal VGL supplied by the voltage generator 60. As shown in FIG. 2, the first clock signal CK includes a plurality of sub-clock signals (including at least the sub-clock signal CK1 to the sub-clock signal CKn+1 in FIG. 2). The plurality of pulses pc1 in the sub-clock signal CK1, the plurality of pulses pc2 in the sub-clock signal CK2, the plurality of pulses pen in the sub-clock signal CKn, and the plurality of pulses pcn+1 in the sub-clock signal CKn+1 are all referred to as first clock pulses.

At step S2, the timing controller is controlled to acquire a refresh rate of the display panel and to generate a control signal according to the refresh rate. The control signal is a first control signal in the case where the refresh rate is greater than a preset value.

That is, the control signal CON generated by the timing controller 20 according to the refresh rate RS of the display panel 10 may include the information about the refresh rate RS of the display panel 10, and is embodied in that the control signal CON is a first control signal in the case where the refresh rate is greater than a preset value, and is a second control signal in the case where the refresh rate is less than or equal to the preset value.

At step S3, the level shifter is controlled to process the first clock signal to generate a second clock signal in the case where the control signal is the first control signal. The second clock signal includes a plurality of second clock pulses corresponding to a plurality of first clock pulses. A duration of a second clock pulse overlaps a duration of a corresponding first clock pulse. An end time of the second clock pulse is later than an end time of the corresponding first clock pulses.

As can be seen from the above discussion, the second clock signal CK' is the first clock signal CK obtained by the charge sharing technology. Whether the first clock signal CK is processed to generate the second clock signal CK' in the embodiments is determined according to the control signal CON. That is, whether the second clock signal CK' is generated by charge sharing for the first clock signal CK is determined according to the refresh rate RS of the display panel 10.

Specifically, in the case where the control signal CON is the first control signal, it indicates that the refresh rate is large, and then the first clock signal CK needs to be processed to generate the second clock signal CK'. In the case where the control signal CON is the second control signal, it indicates that the refresh rate is small, and then it is not necessary to process the first clock signal CK to generate the second clock signal CK'.

In some embodiments, step S3 is followed by steps including but not limited to the following:

At step S4, the gate driver is controlled to generate a first gate signal according to the first clock signal in the case where the refresh rate is less than or equal to the preset value, and to generate a second gate signal according to the second clock signal in the case where the refresh rate is greater than the preset value.

It can be seen from the above discussion that only in the case where the refresh rate RS in the embodiments is greater than the preset value, the control signal CON generated by the timing controller 20 controls the level shifter 30 to process the first clock signal CK to generate the second clock signal CK'. Referring to FIGS. 1, 2 and 5, due to the high refresh rate, the leakage time is short, and the risk of mischarging is small. Even if the charge sharing technology is used to generate the second clock signal CK', the second gate signal is further generated by the second clock signal CK' to control a plurality of rows of the sub-pixels P in the display panel 10 to be turned on, it will not cause a large reduction of the charging rate. On the contrary, it may also reduce the power consumption of the chip.

In some embodiments, the level shifter 30 includes a level shift module 301, a charge sharing module 302 electrically connected to the level shift module 301. The step S1 includes controlling the level shift module to generate the first clock signal. The step S3 includes controlling the charge sharing module to process the first clock signal to generate the second clock signal in the case where the control signal is the first control signal.

That is, the level shift module 301 may generate the first clock signal CK according to the high voltage signal VGH, the low voltage signal VGL, and the clock source signal CLK. The charge sharing module 302 may determine whether to process the first clock signal CK to generate the second clock signal CK' according to the control signal CON. In the case where it is necessary to generate the second clock signal CK', the charge sharing module 302 performs charge sharing processing on both of the plurality of sub-clock signals that are opposite in phase. That is, a line for transmitting the first sub-clock signal CKx (such as the sub-clock signal CK1) and a line for transmitting the second sub-clock signal CKy (such as the sub-clock signal CKn) are short-circuited to generate corresponding two sub-shared sub-clock signals CK1', CKn' (together referred to as the second clock signal CK'). In the case where it is not necessary to generate the second clock signal CK', the charge sharing module 302 directly outputs the first clock signal CK.

In summary, the present disclosure provides a display device, a driving method therefor, and a display terminal. The display device includes a display panel, a timing controller and a level shifter. The timing controller generates a control signal according to a refresh rate of the display panel. The control signal is a first control signal in the case where the refresh rate is greater than a preset value. The level shifter controls and processes the first clock signal to generate a second clock signal in the case where the control signal is the first control signal. That is, whether the charge sharing technology is enabled in the embodiments is determined according to the refresh rate RS of the display panel 10, instead of processing the first clock signal CK to generate the second clock signal CK' by using the charge sharing technology at all refresh rates. Using charge sharing technology only at high refresh rate and avoiding using charge sharing technology at low refresh rate may reduce the risk of mischarge at low refresh rate.

The display device and the driving method therefor, and the display terminal provided by the embodiments of the present disclosure have been described in detail above. The principle and implementations of the present disclosure are described in this specification by using specific examples. The description about the foregoing embodiments is merely provided to help understand the method and core ideas of the present disclosure. Those skilled in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A display device, comprising:

a display panel;

a timing controller configured to generate a control signal according to a refresh rate of the display panel, the control signal being a first control signal in a case where the refresh rate is greater than a preset value; and a level shifter electrically connected to the timing controller, configured to generate a first clock signal and configured to process the first clock signal to generate a second clock signal in a case where the control signal is the first control signal;

wherein the first clock signal comprises a plurality of first clock pulses, the second clock signal comprises a plurality of second clock pulses corresponding to the plurality of the first clock pulses, a duration of each of the second clock pulses overlaps a duration of a corresponding one of the first clock pulses, and an end time of each of the second clock pulses is later than an end time of a corresponding one of the first clock pulses; and wherein the display device further comprises a gate driver, and the gate driver is integrated within the display panel or independent of the display panel, is configured to generate a first gate signal according to the first clock signal in a case where the refresh rate is less than or equal to the preset value, and is configured to generate a second gate signal according to the second clock signal in the case where the refresh rate is greater than the preset value.

2. The display device of claim 1, wherein the level shifter comprises:

a level shift module configured to generate the first clock signal; and a charge sharing module configured to determine whether to process the first clock signal to generate the second clock signal according to the control signal.

3. The display device of claim 2, wherein the first clock signal comprises a first sub-clock signal and a second sub-clock signal that are opposite in phase, the second clock signal comprises a first shared sub-clock signal corresponding to the first sub-clock signal and a second shared sub-clock signal corresponding to the second sub-clock signal;

the charge sharing module comprises a first input module, a second input module, a first output module, a second output module, and a first switching module;

the first input module is configured to receive the first sub-clock signal, and the first sub-clock signal comprises a plurality of first sub-clock pulses;

the second input module is configured to receive the second sub-clock signal, and the second sub-clock signal comprises a plurality of second sub-clock pulses corresponding to the plurality of the first sub-clock pulses; and the first switching module is configured to control the first output module to output the first sub-clock signal and to control the second output module to output the second sub-clock signal according to the control signal, or to control the first output module to output the first shared sub-clock signal and to control the second output module to output the second shared sub-clock signal.

4. The display device of claim 3, wherein the charge sharing module further comprises:

a second switching module configured to control whether the first input module transmits the first sub-clock signal to the first output module according to the control signal; and a third switching module configured to control whether the second input module transmits the second sub-clock signal to the second output module according to the control signal.

5. The display device of claim 1, wherein the timing controller is configured to acquire a frame blanking duration of a previous frame picture, and is configured to calculate a corresponding refresh rate according to the frame blanking duration; or the timing controller is configured to calculate a corresponding refresh rate according to a frame start signal.

6. A display terminal comprising a display device and a motherboard electrically connected to the display device, wherein the motherboard is configured to transmit at least an image signal to the display device to control a display panel to display, and the display device comprises:

the display panel;

a timing controller configured to generate a control signal according to a refresh rate of the display panel, the control signal being a first control signal in a case where the refresh rate is greater than a preset value; and a level shifter electrically connected to the timing controller, configured to generate a first clock signal and configured to process the first clock signal to generate a second clock signal in a case where the control signal is the first control signal;

wherein the first clock signal comprises a plurality of first clock pulses, the second clock signal comprises a plurality of second clock pulses corresponding to the plurality of the first clock pulses, a duration of each of the second clock pulses overlaps a duration of a corresponding one of the first clock pulses, and an end time of each of the second clock pulses is later than an end time of a corresponding one of the first clock pulses; and wherein the display device further comprises a gate driver, and the gate driver is integrated within the display panel or independent of the display panel, is configured to generate a first gate signal according to the first clock signal in a case where the refresh rate is less than or equal to the preset value, and is configured to generate a second gate signal according to the second clock signal in the case where the refresh rate is greater than the preset value.

7. The display terminal of claim 6, wherein the level shifter comprises:

a level shift module configured to generate the first clock signal; and a charge sharing module configured to determine whether to process the first clock signal to generate the second clock signal according to the control signal.

8. The display terminal of claim 7, wherein the first clock signal comprises a first sub-clock signal and a second sub-clock signal that are opposite in phase, the second clock signal comprises a first shared sub-clock signal corresponding to the first sub-clock signal and a second shared sub-clock signal corresponding to the second sub-clock signal;

the charge sharing module comprises a first input module, a second input module, a first output module, a second output module, and a first switching module;

the first input module is configured to receive the first sub-clock signal, and the first sub-clock signal comprises a plurality of first sub-clock pulses;

the second input module is configured to receive the second sub-clock signal, and the second sub-clock signal comprises a plurality of second sub-clock pulses corresponding to the plurality of the first sub-clock pulses;

the first switching module is configured to control the first output module to output the first sub-clock signal and to control the second output module to output the second sub-clock signal according to the control signal, or to control the first output module to output the first shared sub-clock signal and to control the second output module to output the second shared sub-clock signal.

9. The display terminal of claim 8, wherein the charge sharing module further comprises:

a second switching module configured to control whether the first input module transmits the first sub-clock signal to the first output module according to the control signal; and a third switching module configured to control whether the second input module transmits the second sub-clock signal to the second output module according to the control signal.

10. The display terminal of claim 6, wherein the timing controller is configured to acquire a frame blanking duration of a previous frame picture and is configured to calculate a corresponding refresh rate according to the frame blanking duration; or the timing controller is configured to calculate a corresponding refresh rate according to a frame start signal.

11. A driving method for a display device, wherein the display device comprises a display panel, a timing controller, and a level shifter electrically connected to the timing controller, and the driving method for the display device comprises:

controlling the level shifter to generate a first clock signal, the first clock signal comprising a plurality of first clock pulses;

controlling the timing controller to acquire a refresh rate of the display panel and to generate a control signal according to the refresh rate, wherein the control signal is a first control signal in a case where the refresh rate is greater than a preset value; and controlling the level shifter to process the first clock signal to generate a second clock signal in a case where the control signal is the first control signal, wherein the second clock signal comprises a plurality of second clock pulses corresponding to the plurality of the first clock pulses, a duration of each of the second clock pulses overlaps a duration of a corresponding one of the first clock pulses, and an end time of each of the second clock pulses is later than an end time of a corresponding one of the first clock pulses;

wherein the display device comprises a gate driver integrated within the display panel or independent of the display panel; and wherein after the step of controlling the level shifter to process the first clock signal to generate the second clock signal in the case where the control signal is the first control signal, the driving method for the display device further comprises:

controlling the gate driver to generate a first gate signal according to the first clock signal in a case where the refresh rate is less than or equal to the preset value, and to generate a second gate signal according to the second clock signal in the case where the refresh rate is greater than the preset value.

12. The driving method for the display device of claim 11, wherein the level shifter comprises a level shift module, a charge sharing module electrically connected to the level shift module;

wherein the step of controlling the level shifter to generate the first clock signal comprises:

controlling the level shift module to generate the first clock signal; and wherein the step of controlling the level shifter to process the first clock signal to generate the second clock signal in the case where the control signal is the first control signal comprises:

controlling the charge sharing module to process the first clock signal to generate the second clock signal in the case where the control signal is the first control signal.

* * * * *